US009002326B2

(12) United States Patent
Santo et al.

(10) Patent No.: US 9,002,326 B2
(45) Date of Patent: Apr. 7, 2015

(54) SYSTEM AND METHOD FOR PROVIDING NOTIFICATIONS ON A MOBILE DEVICE

(75) Inventors: William Donald Santo, Waterloo (CA); Jong-Suk Lee, Waterloo (CA); Sherman Wang, Waterloo (CA); Gregory Jason Fields, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 34 days.

(21) Appl. No.: 13/473,409

(22) Filed: May 16, 2012

(65) Prior Publication Data

US 2012/0289203 A1    Nov. 15, 2012

Related U.S. Application Data

(63) Continuation of application No. PCT/CA2011/000300, filed on Mar. 24, 2011.

(51) Int. Cl.
*H04Q 7/00* (2006.01)
*H04M 19/04* (2006.01)
*H04W 68/00* (2009.01)

(52) U.S. Cl.
CPC ............ *H04M 19/048* (2013.01); *H04W 68/00* (2013.01)

(58) Field of Classification Search
CPC ........................... H04M 19/04; H04M 19/048
USPC ......... 455/412, 412.2; 348/14.01, 33–34, 126
See application file for complete search history.

(56) References Cited

U.S. PATENT DOCUMENTS

| 6,794,989 | B2 | 9/2004 | Naegely et al. |
| 7,173,533 | B1 | 2/2007 | Beron et al. |
| 8,301,024 | B2 * | 10/2012 | Mather et al. ................. 396/176 |

(Continued)

FOREIGN PATENT DOCUMENTS

| CA | 2464828 A1 | 5/2004 |
| CA | 2506138 A1 | 3/2005 |

(Continued)

OTHER PUBLICATIONS http://en.wikipedia.org/wiki/Fire_alarm_notification_appliance; Last modified on Jul. 12, 2010; retrieved online Sep. 20, 2010.

(Continued)

*Primary Examiner* — Ajit Patel
*Assistant Examiner* — Julio Perez
(74) *Attorney, Agent, or Firm* — Fleit Gibbons Gutman Bongini & Bianco P.L.

(57) ABSTRACT

A method is provided which comprises, upon detecting a particular event, determining that a notification is to be provided for the particular event; and activating a light source acting as a camera flash to provide the notification. The method may further comprise determining if an image capture application is currently active and only having the light source emit the camera flash as the notification if the image capture application is not currently active. The method may also comprise determining an orientation of the mobile device, determining if the image capture application is active, and only having the light source emit the camera flash as the notification if the orientation is indicative of visibility of the light source and if the image capture application is not currently active. The method may also comprise determining that the camera flash is to be modulated; and having the light source modulated.

17 Claims, 10 Drawing Sheets

(56) References Cited

U.S. PATENT DOCUMENTS

| | | | |
|---|---|---|---|
| 2007/0030340 A1* | 2/2007 | Kitano et al. | 348/14.01 |
| 2010/0302237 A1* | 12/2010 | Aramaki | 345/419 |
| 2011/0003616 A1* | 1/2011 | Gorsica et al. | 455/556.2 |
| 2012/0108215 A1* | 5/2012 | Kameli | 455/412.2 |
| 2012/0157161 A1* | 6/2012 | Sethuraman et al. | 455/556.1 |
| 2012/0169486 A1* | 7/2012 | Sweeney et al. | 340/384.1 |

FOREIGN PATENT DOCUMENTS

| | | |
|---|---|---|
| EP | 1755316 A1 | 2/2007 |
| FR | 2865602 A1 | 8/2007 |
| WO | WO 2008/101312 A1 | 8/2008 |

OTHER PUBLICATIONS

Mobile Phone Flash Ball Alert; extract from http://www.paramountzone.com/fball.htm; retrieved online Sep. 20, 2010.

Tardis Mobile Phone Flashing Alert—Dr. Who—TV and Film Stuff—Go Bazaar; extract from http://wists.com/picassosdove/e329e1a22d42ac3f0925813cb16f4302; retrieved online Sep. 20, 2010.

Image of telephone ringer with bright flash taken from http://www.rnid.org.uk/shop/products/alerting_devices/telephone_ringer_with_bright_flash.htm; online at least as early as Jun. 28, 2010.

Image of BlueBerry device taken from http://www.diytrade.com/china/pd/5841815/Blackberry_E_8900_TV_Orbit_BALL_MSN_YAHOO_DUAL_SIM_quad_band_JAVA_FLASH_LIGHT.html; online at least as early as Jun. 28, 2010.

Make LED Flash when new notification received—xda-developers; http://forum.xda-developers.com/showthread.php?t=298637; Mar. 20, 2007; retrieved online Jan. 10, 2011.

Apple—Accessibility—Mac OS X—Hearing; http://www.apple.com/accessibility/macosx/hearing.html; retrieved online Jan. 10, 2011.

Flashlight Alerts: Android Application Review (Notification System) | ANDRANON; http://andranon.com/2010/06/30/flashliqht-alerts-android-application-review-notification-system; Jun. 30, 2010; retrieved online Jan. 10, 2011.

Scott, Anne-Marie; Search Report from corresponding PCT Application No. PCT/CA2011/000300; search completed Dec. 15, 2011.

Sorrentino, Andrea; Supplementary Search Report from corresponding European Application No. 11861732.3; search completed Jul. 29, 2014.

* cited by examiner

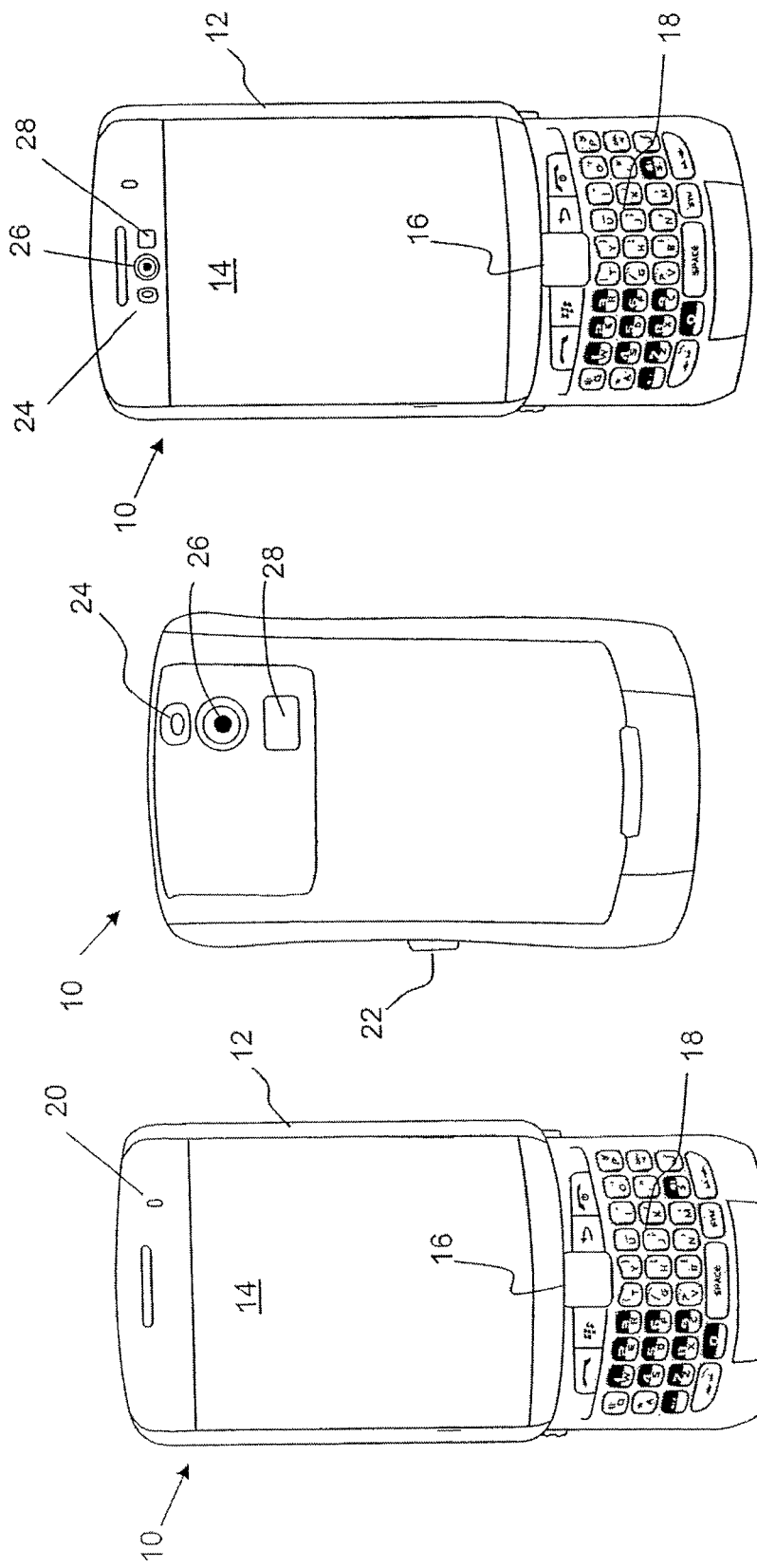

SYSTEM AND METHOD FOR PROVIDING NOTIFICATIONS ON A MOBILE DEVICE

CROSS-REFERENCE TO RELATED APPLICATIONS

The present application is a continuation of PCT Application No. PCT/CA2011/000300 filed on Mar. 24, 2011 incorporated herein by reference.

TECHNICAL FIELD

The following relates to systems and methods for providing notifications on a mobile device.

DESCRIPTION OF THE RELATED ART

Deaf and hard of hearing persons who rely on mobile communication devices to stay connected with colleagues, friends, and family, e.g. via text-based communications, typically rely on various available alert or notification modalities to be made aware of incoming communications since they may be unable to discern such an alert or notification if it only has an audible component to it. Examples include, without limitation, emails, short message service (SMS) messages, instant messages (IMs), etc.

While alerts based on vibrations and/or visual, on-screen, notification modalities, can be important to the ability of those that are deaf or hard of hearing to be made aware of incoming messages, both of these modalities may gradually lose their effectiveness. For example, a softly flashing light emitting diode (LED) may become commonplace from the perspective of the user and thus blend into the ambient environment and be less effective. As a result, deaf and hard of hearing users who rely on these modalities may find it increasingly difficult to be alerted in this way.

BRIEF DESCRIPTION OF THE DRAWINGS

Example embodiments will now be described by way of example only with reference to the appended drawings wherein:

FIG. 1 is a front view of an example mobile device.
FIG. 2 is a rear view of an example mobile device.
FIG. 3 is a front view of an example mobile device.

DETAILED DESCRIPTION

Figure 5:
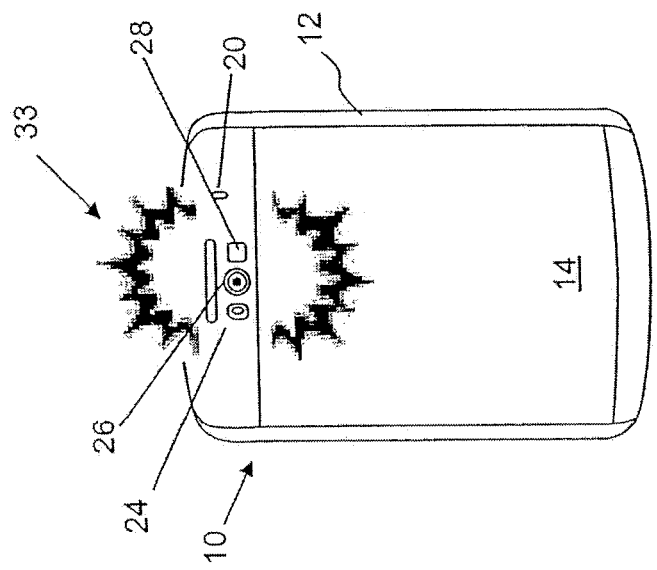
FIG. 5 is a front view of an example mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

Although the following examples are presented in the context of mobile communication devices, the principles may equally be applied to other devices such as applications running on personal computers, embedded computing devices, other electronic devices, and the like.

For clarity in the discussion below, mobile communication devices are commonly referred to as "mobile devices" for brevity. Examples of applicable mobile devices include without limitation, cellular phones, cellular smart-phones, wireless organizers, pagers, personal digital assistants, computers, laptops, handheld wireless communication devices, wirelessly enabled notebook computers, portable gaming devices, tablet computers, or any other portable electronic device with processing and communication capabilities.

It has been found that in addition to traditional vibratory and visual notification modalities potentially blending into the ambient environment, the orientation of the device and thus the visibility of certain features of a mobile device can further decrease the effectiveness of alerting deaf and hard of hearing users in this way. For example, if the mobile device is lying face down thus covering a notification LED, display or other visual notification element, an important notification indicator can be lost or at least greatly diminished. This can result in a user, both deaf/hard or hearing and otherwise, potentially missing incoming communications or at least being less responsive to incoming messages. Although less responsiveness can be dealt with in many circumstances (e.g. by examining the mobile device more often), access to incoming communications can be more important when, for example, the context of the incoming communication pertains to an emergency.

To address the above, rather than, or in addition to, utilizing traditional vibratory and visual notification modalities currently found on mobile devices, a relatively brighter light source such as one acting as a camera flash, can be used as a notification to increase the likelihood that a notification pertaining to an incoming message or other particular event is recognized and distinguished from the ambient environment. Since a camera flash is a bright light source, it can provide a notification that is more salient, conspicuous, prominent, and detectable, than traditional vibratory and visual notification modalities. In some example embodiments, by controlling the way in which the camera flash is used as a notification, it can be distinguishable from other uses of the camera flash as well as provide a plurality of unique notifications that incorporate the camera flash in different ways, e.g. by modulating the light source, changing colors, etc. Since a light source such as a camera flash is typically much brighter than most if not all sources of light in the ambient environment, the likelihood of a deaf or hard or hearing person not recognizing the notification can be greatly diminished.

An exterior view of an example mobile device 10 is shown in FIG. 1 The mobile device 10 in this example comprises a housing 12 which supports a display 14, a positioning device 16 (e.g. track pad, track wheel, etc.), and a keyboard 18. The keyboard 18 may comprise a full-Qwerty (as shown) set of keys but may also provide a reduced Qwerty set of keys (not shown) in other embodiments. The example embodiment shown in FIG. 1 comprises a touchscreen display 14 and a "slide-out" keyboard 18. In operation, the touchscreen display 14 can be used to interact with applications on the mobile device 10 and the keyboard 18 may be slid out from behind the touchscreen display 14 as shown, when desired, e.g. for typing or composing an email, editing a document, etc. The front face of the housing 12 in this example embodiment also includes a notification light emitting diode (LED) 20, which may be flashed to indicate a new incoming communication or other event.

A rear view of a mobile device 10 is shown in FIG. 2. In the example embodiment shown in FIG. 2, the rear portion of the housing 12 includes a light source 24, which may be used to illuminate an object for taking capturing a video image or photo. Also situated on the rear face of the housing 12 are a camera lens 26 and a reflective surface 28. The camera lens 26 allows the light that represents an image to enter into the camera device. The reflective surface 28 displays an image that is representative of the camera device's view and assists, for example, a user to take a self-portrait photo. The camera device may be activated by pressing a camera button 17. The camera button 17 is able to activate photo and video capturing functions when pressed, for example, in a direction towards the housing 12. It can be appreciated that the view shown in FIG. 2 may, in some example embodiments, correspond to a rear view of a mobile device 10 such as or similar to that shown in FIG. 1 and thus the camera components 24, 26, 28 would, in such example embodiments, be situated on the rear face or "back" of the mobile device 10. As illustrated in FIG. 3, the camera components 24, 26, 28, may also be situated on a front face of the mobile device 10. It can be appreciated that in some example embodiments, a pair of camera devices (e.g. each including a light source 24, camera lens 26, and reflective surface 28), one being situated on the front face of the housing 12 and the other being situated on the back of the housing 12. In example such embodiments, the mobile device 10 can be operated to acquire an image from the perspective of a user holding the mobile device 10 as well as one towards that user.

It can be appreciated that the mobile devices 10 shown in FIGS. 1 to 3 are provided as examples for illustrative purposes only and various features thereof have been omitted for brevity. For example, other embodiments may include mobile devices 10 wherein the housing 12 provides a foldable or flippable, clamshell type mechanism to fold the display 14 towards the keyboard 18 to effectively transition the mobile device 10 between an operable or open state and a standby or closed state.

Figure 4:
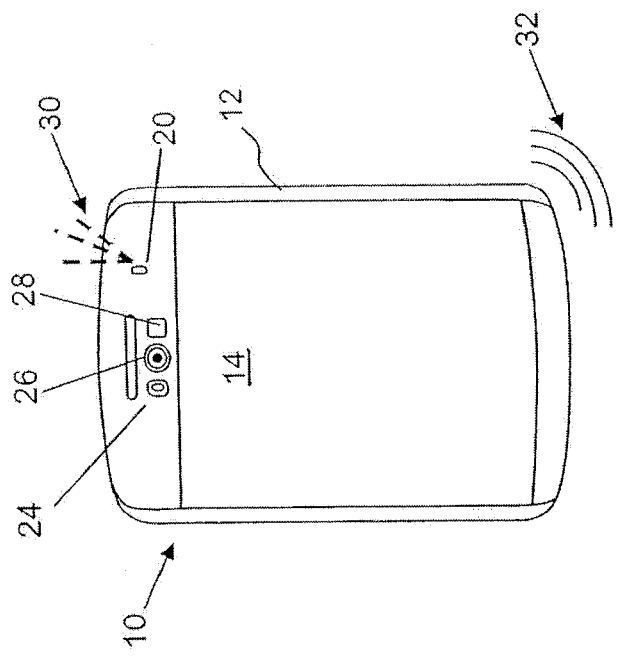
FIG. 4 is a front view of an example mobile device.

FIG. 4 illustrates a mobile device 10 of the example embodiment shown in FIG. 1 with the keyboard 18 stored or stowed behind the touch screen 14. In the example embodiment shown in FIG. 4, an example alert is shown, wherein the mobile device 10 utilizes the LED 20 and a vibration of the housing 12 (denoted by vibration lines 32) to provide dual notification indicators indicative of a particular event such as the receipt of a new communication. As discussed above, it has been recognized that the LED 20, even if combined with a vibratory or other tactile type indicator, can blend into the ambient environment and become less effective over time, in particular for those that are deaf or hard of hearing.

To provide a more recognizable and distinguishable notification that is less likely to be mistaken for ambient environmental effects, the camera light source 26 can be triggered to emit a flash 33 as shown in FIG. 5. Since the camera's flash 33 is typically one of the, if not the, brightest light in most ambient environments, it may be less likely to be missed and can be used as a distinguishable notification indicator, e.g. to signify important or urgent communications. Moreover, by controlling when the light source 26 is used, and the way in which it is modulated, the camera flash 33 can be distinguishable not only from other types of notification indicators but also normal use of the camera light source 26, i.e. when capturing an image. By ensuring that a camera application is not being used at the same time, the mobile device 10 can avoid confusion between a flash 33 associated with an image and a flash 33 used as a notification indicator.

Figure 6:
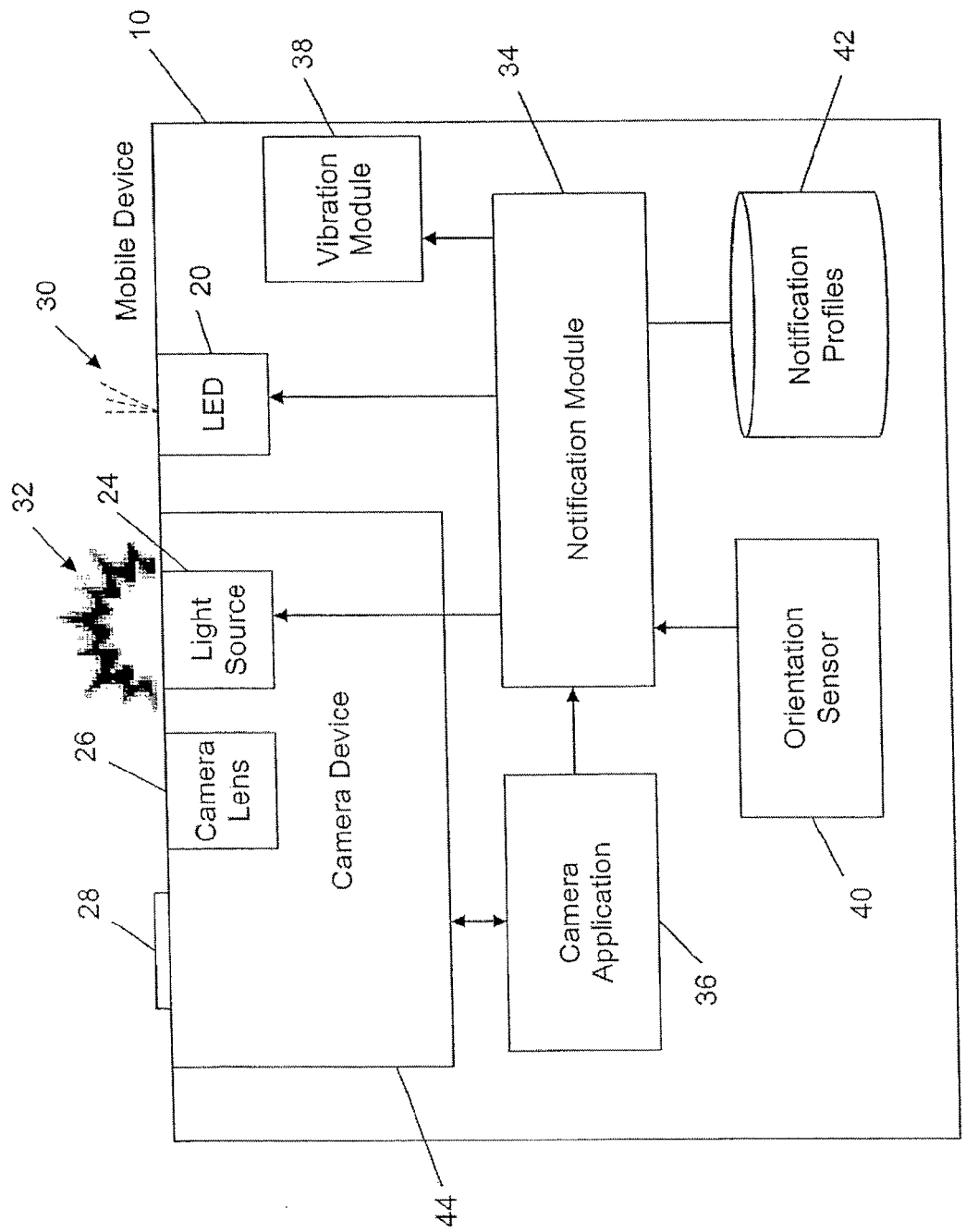
FIG. 6 is a block diagram illustrating an example configuration for controlling notifications on a mobile device.

Turning now to FIG. 6, an example configuration for a mobile device 10 is shown. The mobile device 10 in this example embodiment includes a notification module 34. The notification module 34 is operable to activate, initiate or otherwise trigger or utilize a vibration module 38, LED 20, and light source 24 of a camera device 44 in order to output zero or more alert or notification indicators according to one or more notification profiles 42. It can be appreciated that a notification profile 42 may specify that in corresponding circumstances zero notification indicators are to be used whereas in other notification profiles 42 various combinations of one or more notification indicators may be used.

The notification profiles 42 may include both predetermined profiles and those that are customizable/editable by a user. A selected notification profile 42 can be used to provide a particular zero or more notification indicators for every event for which a notification is used. For example, the notification profiles 42 may include "LOUD", "NORMAL", "QUIET", "PHONE ONLY", "VIBRATE", "OFF", etc. The notification profiles 42 may also be used in combination based on contact type, communication type, etc., and exceptions to a currently selected notification profile 42 may be used. The notification profiles 42 may be accessible, e.g. via a user interface (UI) to enable customization and/or editing of an existing notification profile 42 or creation of a notification profile 42. As such, it can be appreciated that the notification profiles 42 can include any definition, rule, parameter, or setting corresponding to or otherwise related to the provision of zero or more notification indicators in response to one or more events detected on or by the mobile device 10.

In an example embodiment, the notification module 34 can detect events that trigger a particular notification profile 42 by receiving inputs from, for example, an operating system (OS) 134 (see FIG. 7), from an application, from an external component (not shown), etc. The notification module 34 in this example embodiment may also receive inputs from internal components such as a camera application 36 and an orientation sensor 40. Such inputs may be used by the notification module 34 to determine which, if any, notification profiles 42 should be used based on the detection of a particular event. For example, detecting one type of event may cause the notification module 34 to use a currently selected notification profile 42, whereas detecting another type of event may cause the notification module 34 to select a different notification profile 42 (e.g. an exception to the currently selected notification profile 42).

As will be discussed in greater detail below, the notification module 34 in this example embodiment is programmed, configured or otherwise operable to utilize the light source 24 from the camera device 44 as a notification indicator 24, wherein use of the light source 24 may be specified in one or more notification profiles 42 or be used independently thereof.

Figure 7:
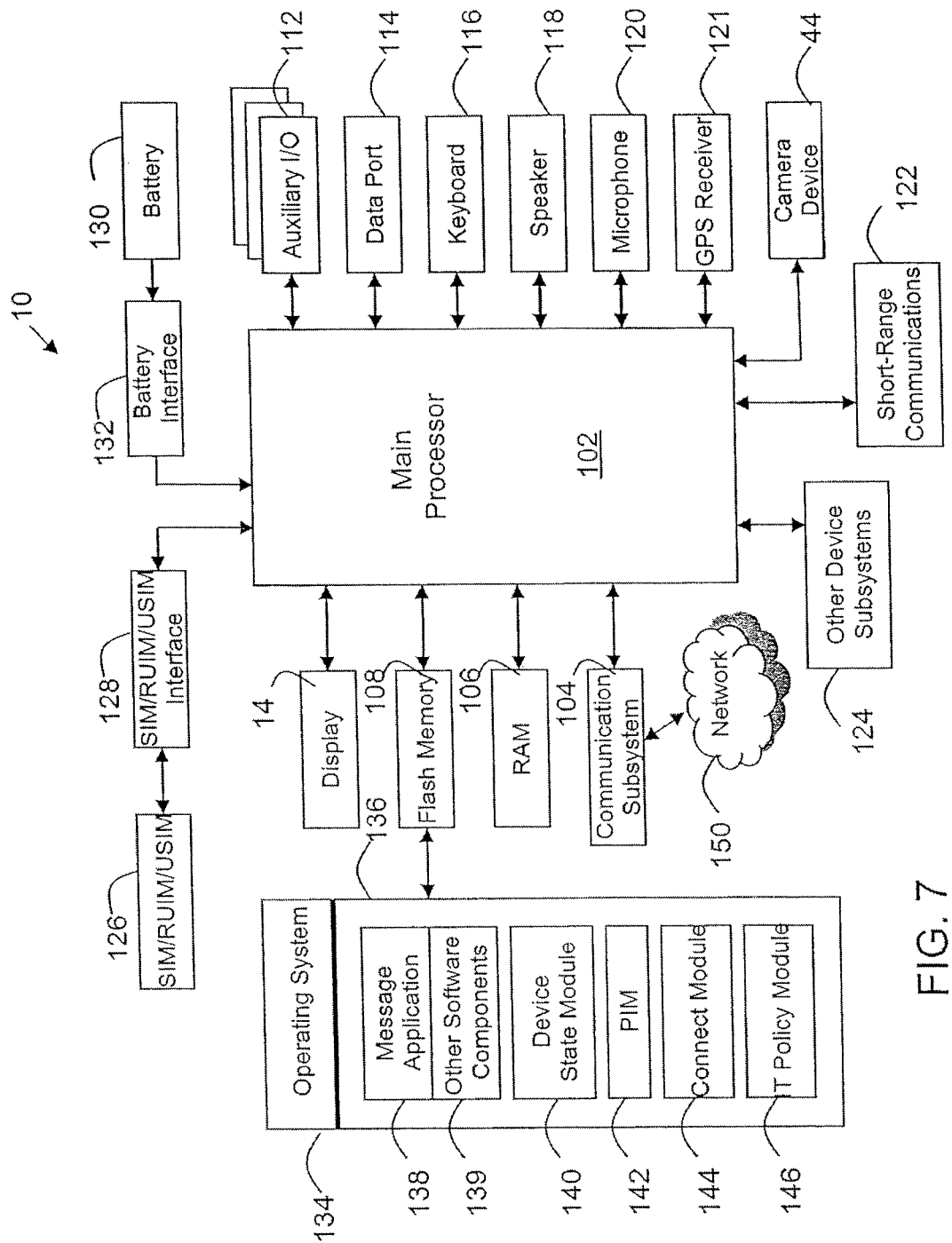
FIG. 7 is a block diagram illustrating an example configuration for a mobile device.

Referring now to FIG. 7, shown therein is a block diagram of an example embodiment of a mobile device 10, which provides further detail thereof. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 150. In this example embodiment of the mobile device 10, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 150 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 34, an auxiliary input/output (I/O) subsystem 112, a data port 114, a keyboard 116, a speaker 118, a microphone 120, GPS receiver 121, magnetometer 24, short-range communications 122, and other device subsystems 124.

Some of the subsystems of the mobile device 10 perform communication-related functions, whereas other subsystems may provide "resident" or on-device functions. By way of example, the display 34 and the keyboard 116 may be used for both communication-related functions, such as entering a text message for transmission over the network 150, and device-resident functions such as a calculator or task list.

The mobile device 10 can send and receive communication signals over the wireless network 150 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 10 and to personalize the mobile device 10, among other things. Without the component 126, the mobile device 10 may not be fully operational for communication with the wireless network 150. By inserting the SIM/RUIM/USIM 126 into the SIM/RUIM/USIM interface 128, a subscriber can access all subscribed services. Services may include: web browsing and messaging such as e-mail, voice mail, SMS, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 10 is typically a battery-powered device and may include a battery interface 132 for receiving one or more batteries 130 (typically rechargeable). In at least example some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system (OS) 134 and software components 136 to 146. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Other software applications include a message application 138 that can be any suitable software program that allows a user of the mobile device 10 to send and receive electronic messages. Various alternatives exist for the message application 138 as is well known to those skilled in the art. Messages that have been sent or received by the user are typically stored in the flash memory 108 of the mobile device 10 or some other suitable storage element in the mobile device 10. In at least some example embodiments, some of the sent and received messages may be stored remotely from the mobile device 10 such as in a data store of an associated host system that the mobile device 10 communicates with.

The software applications can further comprise a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 10 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 150. PIM data items may be seamlessly integrated, synchronized, and updated via the wireless network 150 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 144, and an IT policy module 146. The connect module 144 implements the communication protocols that are required for the mobile device 10 to communicate with the wireless infrastructure and any host system, such as an enterprise system, that the mobile device 10 is authorized to interface with.

The connect module 144 includes a set of APIs that can be integrated with the mobile device 10 to allow the mobile device 10 to use any number of services associated with the enterprise system. The connect module 144 allows the mobile device 10 to establish an end-to-end secure, authenticated communication pipe with a host system (not shown). A subset of applications for which access is provided by the connect module 144 can be used to pass IT policy commands from the host system to the mobile device 10. This can be done in a wireless or wired manner. These instructions can then be passed to the IT policy module 146 to modify the configuration of the device 10. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 10. Applications for which the IT policy may be applicable then respond by reading the IT policy data to look for IT policy rules that are applicable.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc.

The additional applications 139 can be loaded onto the mobile device 10 through at least one of the wireless network 150, the auxiliary I/O subsystem 112, the data port 114, the short-range communications subsystem 122, or any other suitable device subsystem 124. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 114 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

The short-range communications subsystem 122 provides for communication between the mobile device 10 and different systems or devices, without the use of the wireless network 150. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 104 and input to the main processor 102. The main processor 102 may then process the received signal for output to the display 34 or alternatively to the auxiliary I/O subsystem 112. A subscriber may also compose data items, such as e-mail messages, for example, using the keyboard 116 in conjunction with the display 34 and possibly the auxiliary I/O subsystem 112. The auxiliary subsystem 112 may comprise devices such as: a touch screen, mouse, track ball, infrared fingerprint detector, or a roller wheel with dynamic button pressing capability. The keyboard 116 is an alphanumeric keyboard and/or telephone-type keypad. However, other types of keyboards may also be used. A composed item may be transmitted over the wireless network 150 through the communication subsystem 104.

For voice communications, the overall operation of the mobile device 10 in this example is substantially similar, except that the received signals are output to the speaker 118, and signals for transmission are generated by the microphone 120. Alternative voice or audio I/O subsystems, such as a voice message recording subsystem, can also be implemented on the mobile device 10. Although voice or audio signal output is accomplished primarily through the speaker 118, the display 34 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10 (or other computing or communication device that utilizes similar principles) or accessible or connectable thereto. Any application or module herein described may be implemented using computer readable/executable instructions that may be stored or otherwise held by such computer readable media.

Figure 8:
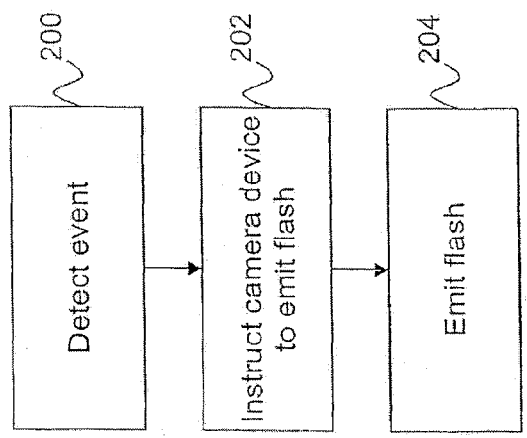
FIG. 8 is a flow chart including an example set of computer executable operations for utilizing a camera flash as a notification indicator.

Turning now to FIG. 8, an example set of computer executable operations are shown that may be performed by the mobile device 10 in utilizing the light source 24 as a notification indicator. At 200, the notification module 34 detects and event. The event itself may be detected by the notification module 34 or detection thereof by another component of the mobile device 10 may be communicated to the notification module 34. The notification module 34 instructs the camera device 44 to emit a flash using the light source 24 at 202, and the light source 24 emits a flash at 204 as a notification indicator. It can be appreciated that the operations shown in FIG. 8 may be performed according to one or more of the notification profile 42 or independently thereof.

Figure 9:
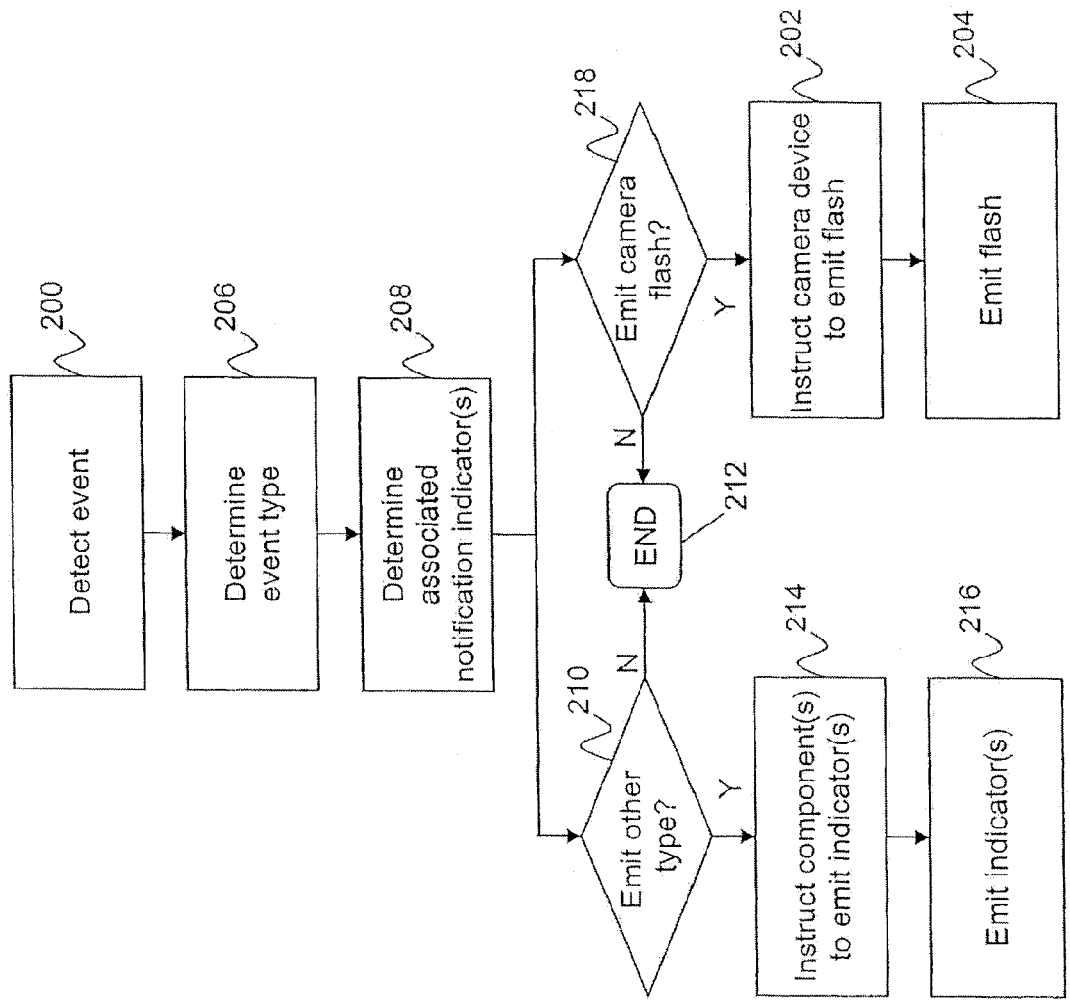
FIG. 9 is a flow chart including an example set of computer executable operations for utilizing a camera flash as a notification indicator with other indicators according to event type.

FIG. 9 illustrates an example set of computer executable operations that may be performed in utilizing the light source 24 as a notification indicator. In the example embodiment shown in FIG. 9, it can be seen that a camera flash from the light source 24 may be used in combination with zero or more other types of notification indicators. Similar to FIG. 8, an event is detected at 200. In this example embodiment, the notification module 34 determines at 206 an event type. For example, one event type may correspond to text-based communications, another event type may correspond to voice-based communications, yet another event type may correspond to calendar appointments/events, etc. The notification module 34 determines at 208, the zero or more notification indicators associated with the detected event type. For example, the notification module 34 may reference the notification profiles 42 to determine which notification profile 42 to use according to the particular event type and which zero or more notification indicators are associated with that notification profile 42. If the notification module 34 determines at 210 that one or more other types of notification indicators (i.e. other than the camera flash) are to be used, the corresponding components (e.g. vibration module 38, LED 20, etc.) are instructed at 214 to emit such other notification indicators at 216. If no other notification indicators are to be used, the method ends at 212.

In this example embodiment, the notification module 34 may also determine at 218 if the camera flash is to be used as a notification indicator. If it is determined at 218 that the camera flash is to be used as a notification indicator, the notification module 34 may instruct the camera device 44 at 202 to have the light source 24 emit a flash at 204, similar to that shown in FIG. 8. It can be appreciated that the camera flash is shown separately from the other notification indicators in FIG. 9 for illustrative purposes only.

Figure 10:
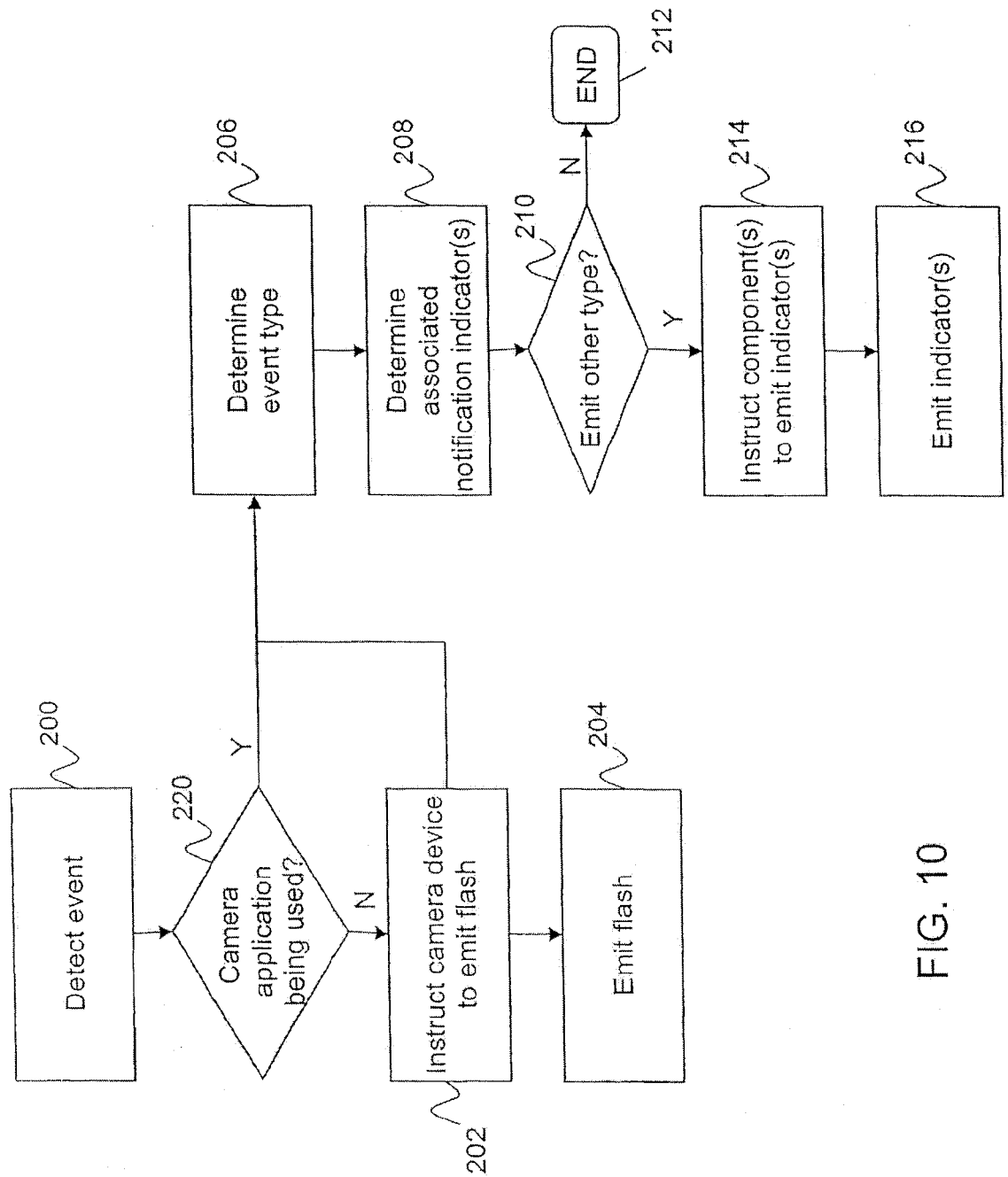
FIG. 10 is a flow chart including an example set of computer executable operations for utilizing a camera flash as a notification indicator with other indicators according to event type and whether or not a camera application is currently being used.

FIG. 10 illustrates another example set of computer executable operations that may be implemented by the notification module 34 in utilizing the camera flash as a notification indicator. In this example embodiment, the notification module 34 is operable to utilize the camera flash for all event-based notifications unless it detects the camera application 36 or other image capture application is currently active. This may be especially useful when, for example, the user is hard of hearing or deaf and the use of the camera flash as a notification indicator provides a more detectable indicator. As discussed above, it has been found that if the camera application 36 is currently active (e.g. is being used), the light source 24 of the camera device 44 is more likely to be used for capturing an image or video and thus use of the light source 24 as a notification indicator could be confused with use of the camera application 36. To address such scenarios, the notification module 34, after detecting an event at 200, may determine at 220 if the camera application 36 is being used. If not, the camera device 44 may be instructed at 202 to utilize the light source 24 to emit a flash at 204 as a notification indicator associated with the event detected at 200.

In the example embodiment shown in FIG. 10, whether or not the camera flash is to be utilized, the notification module 34 may then determine the event type at 206, determine any associated notification indicators at 208 and, if other notification indicators are to be used, perform operations 210 through 216 similar to that described above making reference to FIG. 9. As such, it can be appreciated that the use of a camera flash as a notification indicator may be used according to the usage of the camera application 36 and may also be used in combination with zero or more other notification indicators for alerting or otherwise notifying a user of an event detected at 200.

Figure 11:
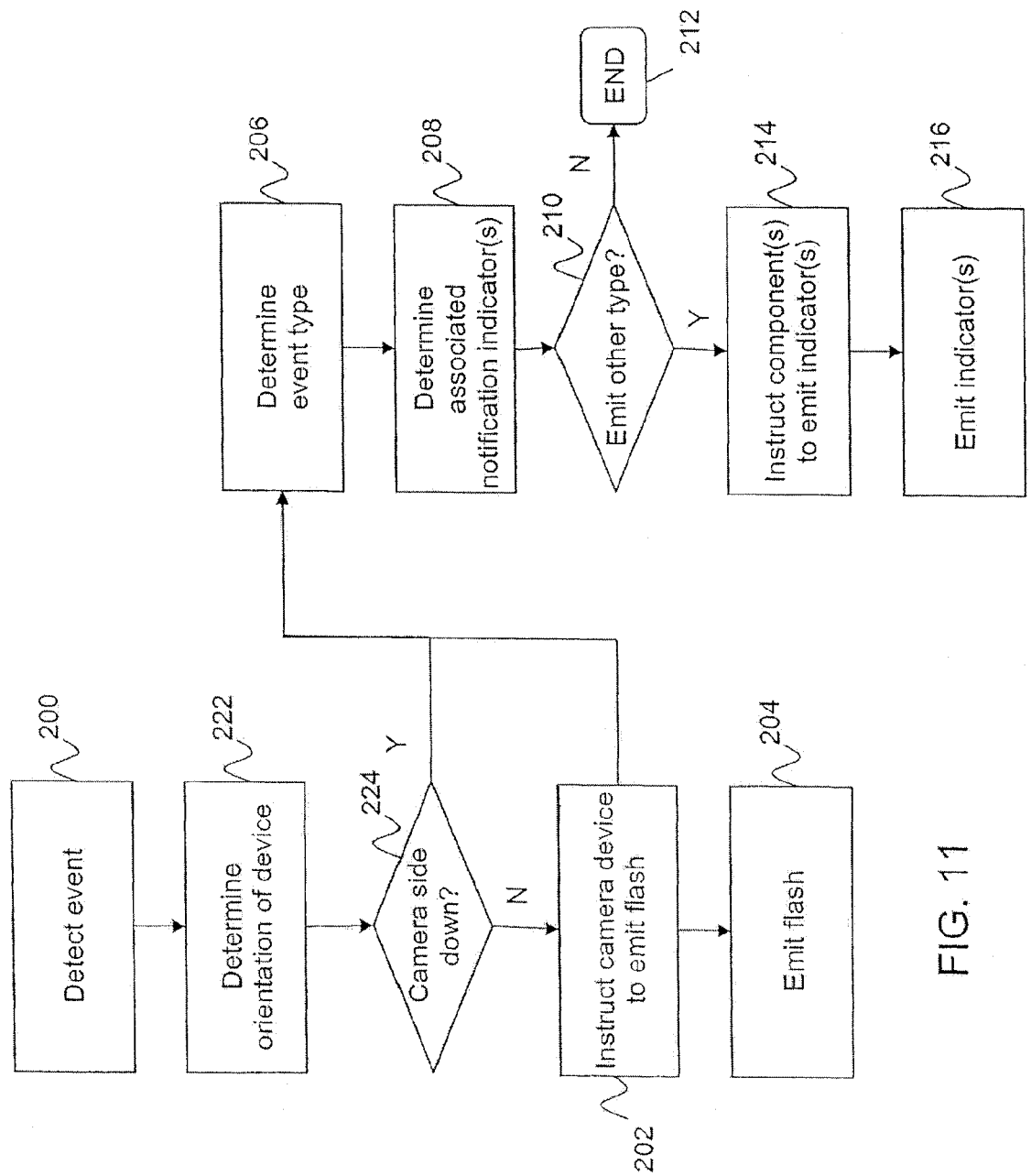
FIG. 11 is a flow chart including an example set of computer executable operations for utilizing a camera flash as a notification indicator with other indicators according to event type and the orientation of the mobile device.

FIG. 11 illustrates another example set of computer executable operations that may be implemented by the notification module 34 in utilizing the camera flash as a notification indicator. In this example embodiment, the notification module 34 is operable to utilize the camera flash for all event-based notifications unless it detects the surface of the housing 12 which supports the light source 24 is visibly obstructed, e.g. by being "camera side down". In the example embodiment shown in FIG. 2 camera side down, would correspond to the rear face of the housing 12 facing an obstruction (e.g. face down on a table) whereas in the example embodiment shown in FIG. 3, camera side down may correspond to either the front face or rear face of the housing being obstructed, depending on whether or not two camera devices 44 are being used and which of the light sources 24 are being used to emit the camera flash. It can be appreciated that if multiple camera devices 44 are provided and a plurality of light sources 24 are used to emit the camera flash as a notification indicator, the orientation of the mobile device 10 and the detection of an obstruction (such as being face down on a table) may be utilized to determine whether or not one of the light sources 24 should not be used to conserve battery power, since it would not have the same effect as if it were not obstructed.

Upon detecting an event at 200, the notification module 34 may then determine the orientation of the mobile device 10 at 222 and determine whether or not the camera side is down at 224 or that the light source 24 would otherwise be obstructed. For example, the notification module 34 may be notified or be able to reference an orientation sensor 40 to determine that the orientation of the mobile device 10 is currently holding a relatively steady state and its "camera side" is directed towards the Earth. This may suggest that the mobile device's light source 24 may be obstructed by virtue of facing toward a surface supporting the mobile device 10. In such scenarios, the effectiveness of the light source 24 would be diminished and thus usage of the camera flash as a notification indicator can be bypassed or otherwise suppressed or not utilized to conserve battery power. It can be appreciated that the orientation sensor 40 in the example embodiment shown in FIG. 6 may correspond to or be communicable with any one or more of a magnetometer, accelerometer, gyroscope, or other orientation sensing component or device.

If the notification module 34 determines that the mobile device 10 is not camera side down at 224, the camera device 44 may be instructed at 202 to utilize the light source 24 to emit a flash at 204 as a notification indicator associated with the event detected at 200. In this example embodiment, whether or not the camera flash is used as a notification indicator, the notification module 34 may also determine the event type at 206 and perform operations 208 through 216 similar to the example embodiment shown in FIG. 10.

Figure 12:
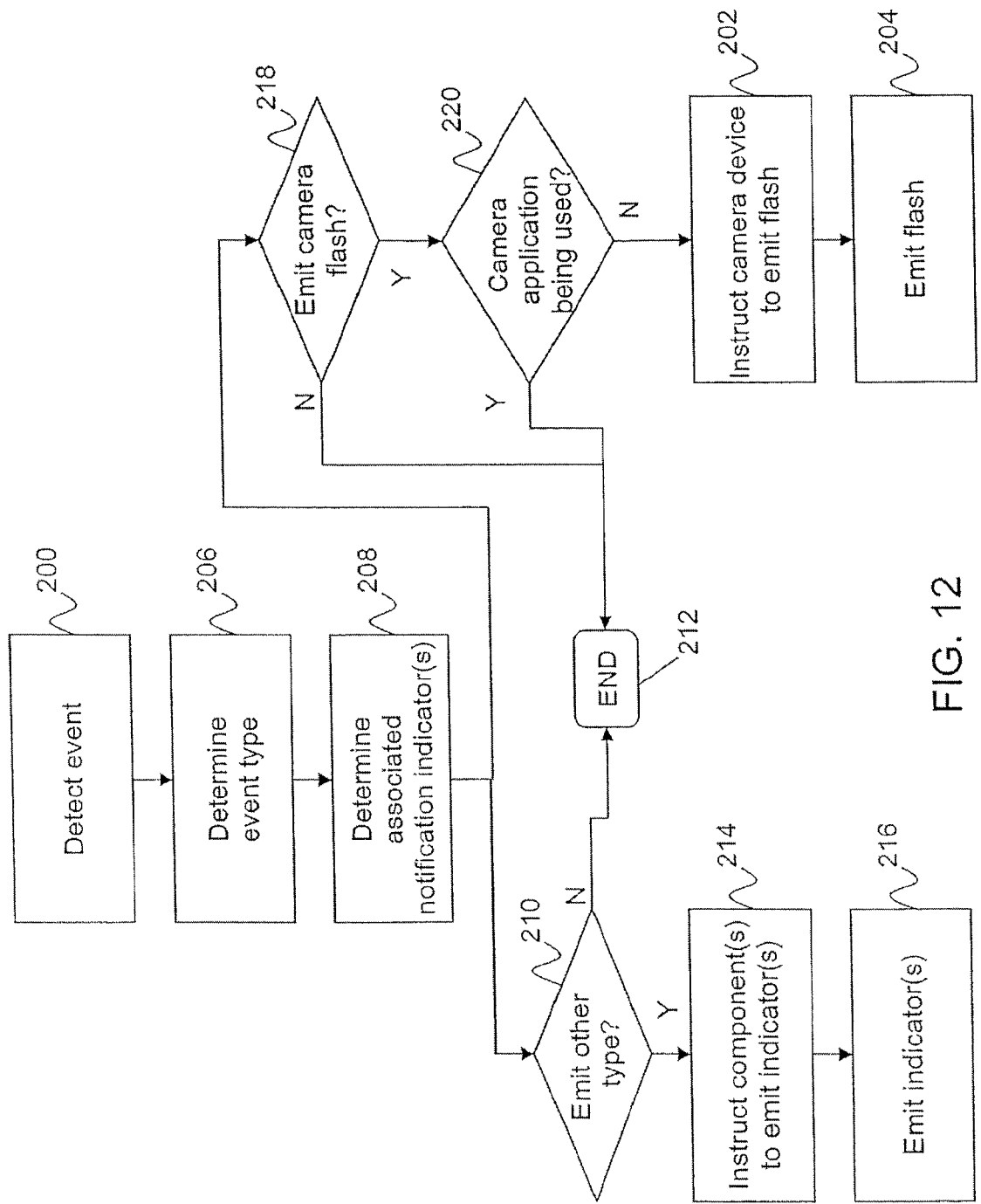
FIG. 12 is a flow chart including another example set of computer executable operations for utilizing a camera flash as a notification indicator with other indicators according to event type and whether or not a camera application is currently being used.

FIG. 12 illustrates another example set of computer executable operations that may be implemented by the notification module 34 in utilizing the camera flash as a notification indicator. In this example embodiment, the notification module 34 is operable to utilize the camera flash according to event type, similar to the example embodiment shown in FIG. 9. In the example embodiment shown in FIG. 12, upon detecting an event at 200 and determining the event type at 206 and the associated notifications at 208, the notification module 34 determines if the camera flash is to be emitted at 218, determines whether or not the camera application 36 is being used at 220, and performs operations 202, and 204 if the camera flash is to be used and if the camera application 36 is not currently being used, as discussed by way of example above. Similarly, the notification module 34 may determine at 210 whether or not additional notification indicators are to be used and may perform operations 212 through 216 as discussed by way of example above.

Figure 13:
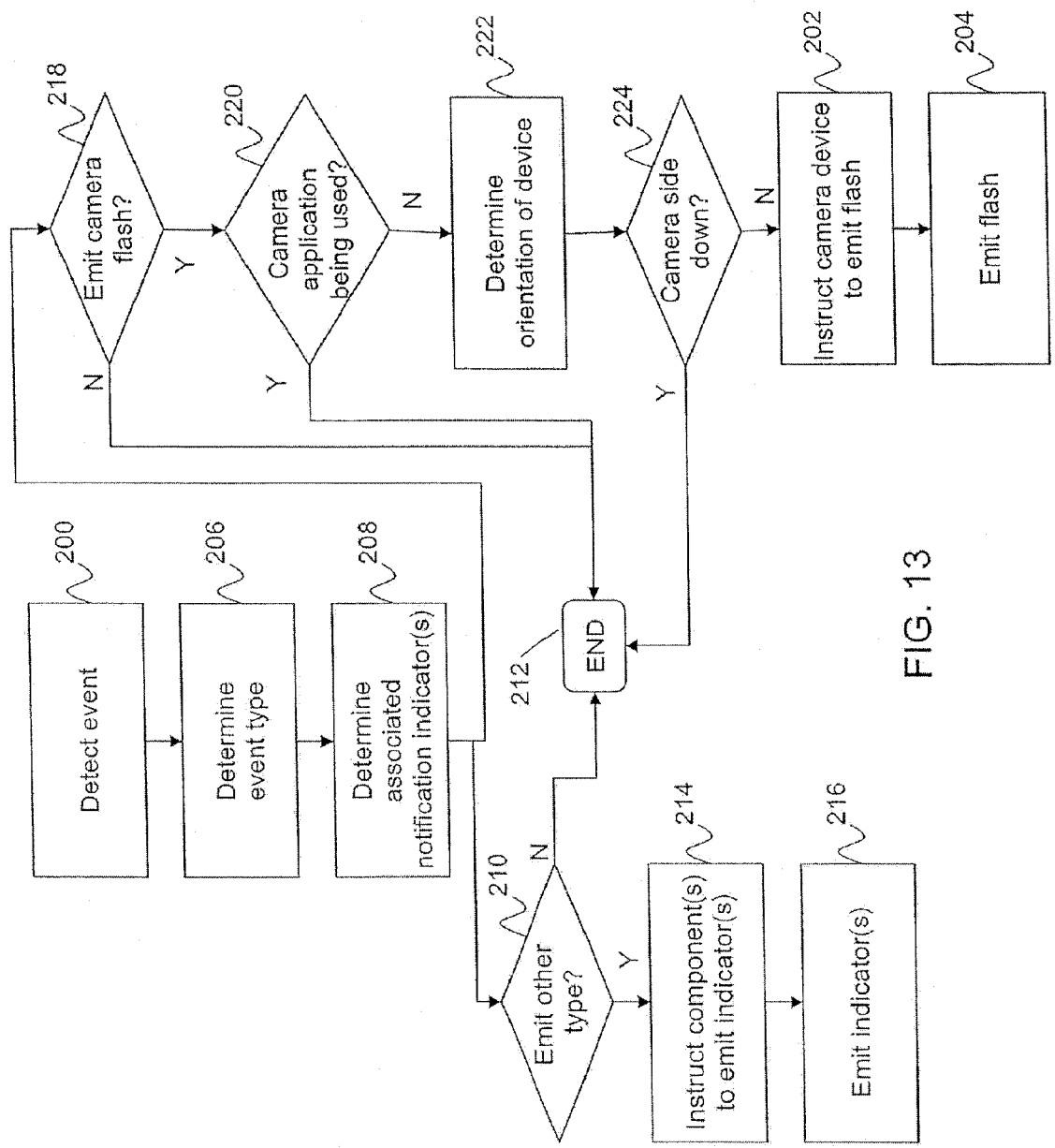
FIG. 13 is a flow chart including an example set of computer executable operations for utilizing a camera flash as a notification indicator with other indicators according to event type, the orientation of the mobile device, and whether or not a camera application is currently being used.

FIG. 13 illustrates another example set of computer executable operations that may be implemented by the notification module 34 in utilizing the camera flash as a notification indicator. In this example embodiment, the notification module 34 is operable to utilize the camera flash according to event type, similar to the example embodiments shown in FIGS. 9 and 12. Additionally, the notification module 34 is, in this example embodiment, operable to determine whether or not to use the camera flash as a notification indicator according to the usage of the camera application 36 and the orientation of the mobile device 10 similar to the example embodiments shown in FIGS. 10 and 11. In the example embodiment shown in FIG. 13, it can be appreciated that the operations shown may be performed in a manner similar to that shown in FIG. 12 with the additional operations 222 and 224 (previously discussed in the earlier discussion of FIG. 11 herein) being performed prior to utilizing the light source 24 to emit a camera flash. As such, it can be appreciated that the various inputs utilized to determine whether or not to use the light source 24 to provide a camera flash as a notification indicator, and whether or not to do so in combination with zero or more other notification indicators may be used in various combinations and permutations.

Figure 14:
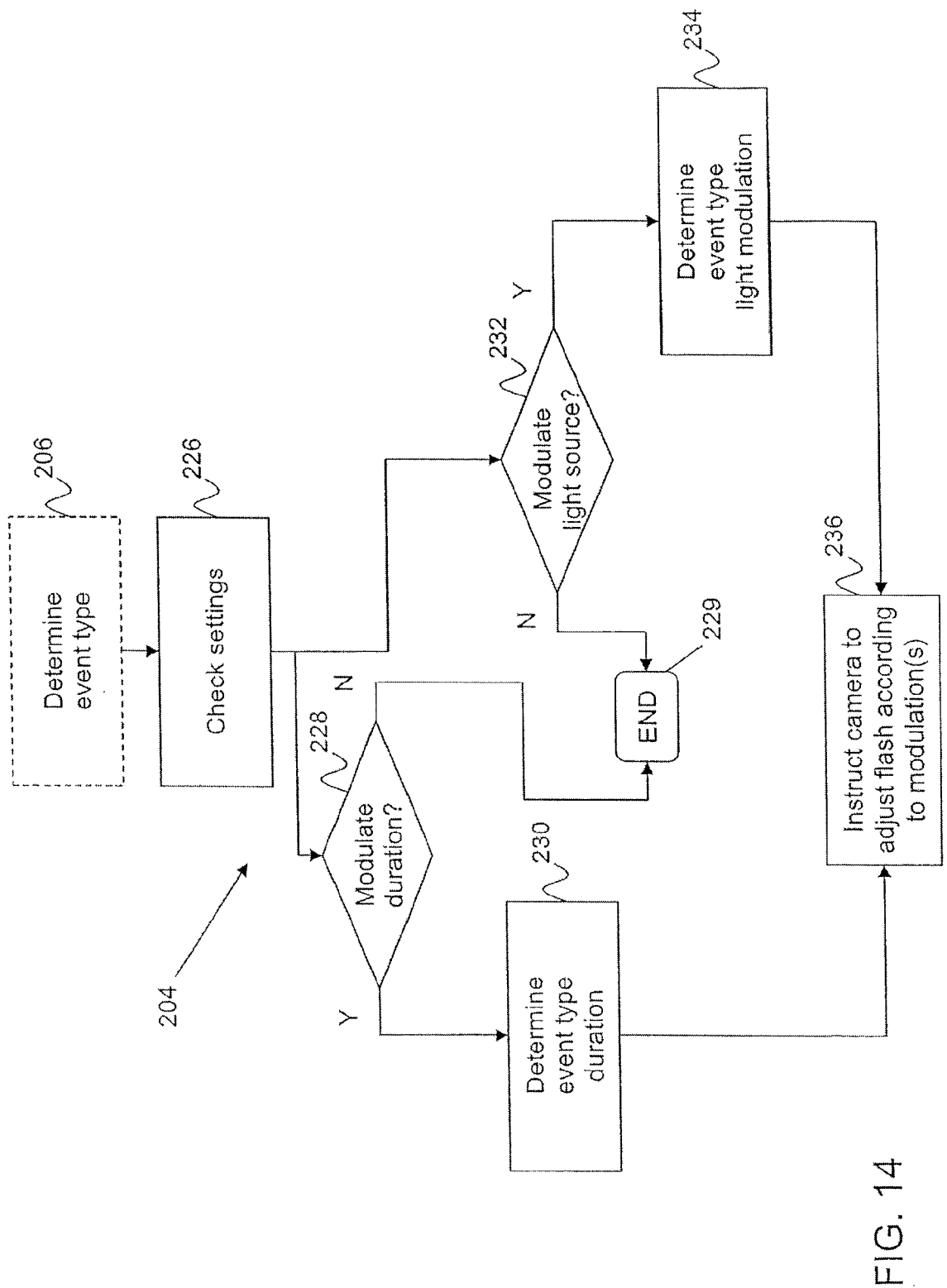
FIG. 14 is a flow chart including another example set of computer executable operations for modulating a camera flash when used as a notification indicator.

As discussed above, not only can the camera's light source 24 be used to emit a camera flash as a notification indicator, the camera flash itself may be modulated in order to distinguish between event types, distinguish between usage of the camera flash for capturing images versus as a notification indicator, to distinguish between relative levels of urgency or importance, etc. Turning now to FIG. 14, an example set of computer executable operations are shown which may be performed by the notification module 34, the camera device 44, or both in cooperation, to modulate the camera flash, e.g. when instructing the camera device 44 to emit a flash at 204. In FIG. 14, a determination of the event type is shown in dashed lines at 206 since such an operation may be required or have already occurred. The notification modules 34 in this example embodiment checks one or more settings at 226 to determine how to modulate the light source 24 according to event type. For example, such settings may be used in conjunction with or form part of the notification profiles 42. The notification module 34 determines whether or not the light source's duration is to be modulated at 228. If so, the notification module 34 determines the duration at which the flash should be emitted according to the event type at 230 such that the flash can adjusted to accommodated according to such modulation at 236. If the duration of the camera flash is not to be modulated, the duration-modulation branch ends at 229.

The notification module 34 in this example embodiment also determines at 232 whether or not to modulate the light source 24 itself. For example, if the light source 24 is capable of emitting multiple colors, the notification module 34 can instruct the light source 24 to emit particular colors according to event type, etc. Similarly, if the brightness or light swath can be adjusted, a different brightness and/or swath size can be associated with different event types. If the light source 24 itself is not to be modulated, the source-modulation branch ends at 229. If the light source 24 itself is to be modulated, the type of modulation (e.g. color, brightness, swath width) may be determined at 234 in order to instruct the camera device 44 to adjust the flash according to the modulation(s) (if any) determined at 230 and 234. In this way, not only can selective use of the light source 24 be controlled to distinguish certain notifications from others, further granularity can be provided by modulating the duration at which the light source 24 is emitted (e.g. strobe, long/short pulses, etc.) and/or vary the light source's properties such as its color, brightness, etc.

It will be appreciated that the example embodiments and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above principles have been described with reference to certain specific example embodiments, various modifications thereof will be apparent to those skilled in the art as outlined in the appended claims.

The invention claimed is:

1. A method of providing event notifications on a mobile device having a camera flash associated with a camera application for capturing images, comprising:
   upon detecting a particular event, determining that a notification is to be provided for the particular event;
   determining whether or not the camera application is currently being used;
   when the camera application is currently being used, activating at least one notification modality other than the camera flash to provide the notification; and when the camera application is not currently being used:
   determining a physical orientation of the mobile device indicative of a visibility of the camera flash;
   when the physical orientation indicates that the camera flash is visible, activating the camera flash to provide the notification for the particular event; and
   when the physical orientation indicates that the camera flash is not visible, activating the at least one notification modality other than the camera flash for the particular event.

2. The method according to claim 1, further comprising determining that one or more additional notifications are to be provided with the camera flash; and having one or more corresponding components of the mobile device activate the one or more additional notifications.

3. The method according to claim 2, wherein the one or more additional notifications comprise a vibration of the mobile device.

4. The method according to claim 1, further comprising determining that the camera flash is to be modulated; and modulating the camera flash.

5. The method according to claim 4, wherein the camera flash is modulated by changing a duration that the camera flash is activated.

6. The method according to claim 5, wherein modulating the duration comprises activating the camera flash according to a predetermined pattern.

7. The method according to claim 4, wherein one or more properties of the camera flash are modulated.

8. The method according to claim 7, wherein the one more properties comprises at least one of a color, a brightness, and a swath size.

9. A non-transitory computer readable storage medium comprising computer executable instructions for providing event notifications on a mobile device having a camera flash associated with a camera application for capturing images, the computer executable instructions comprising instructions for:
  upon detecting a particular event, determining that a notification is to be provided for the particular event;
  determining whether or not the camera application is currently being used;
  when the camera application is currently being used, activating at least one notification modality other than the camera flash to provide the notification; and
  when the camera application is not currently being used:
    determining a physical orientation of the mobile device indicative of a visibility of the camera flash;
    when the physical orientation indicates that the camera flash is visible, activating the camera flash to provide the notification for the particular event; and
    when the physical orientation indicates that the camera flash is not visible, activating the at least one notification modality other than the camera flash for the particular event.

10. The non-transitory computer readable medium according to claim 9, further comprising instructions for determining that one or more additional notifications are to be provided with the camera flash; and having one or more corresponding components of the mobile device activate the one or more additional notifications.

11. The non-transitory computer readable medium according to claim 10, wherein the one or more additional notifications comprise a vibration of the mobile device.

12. The non-transitory computer readable medium according to claim 9, further comprising instructions for determining that the camera flash is to be modulated; and modulating the camera flash.

13. The non-transitory computer readable medium according to claim 12, wherein the camera flash is modulated by changing a duration that the camera flash is activated.

14. The non-transitory computer readable medium according to claim 13, wherein modulating the duration comprises activating the camera flash according to a predetermined pattern.

15. The non-transitory computer readable medium according to claim 12, wherein one or more properties of the camera flash are modulated.

16. The non-transitory computer readable medium according to claim 15, wherein the one more properties comprises at least one of a color, a brightness, and a swath size.

17. A mobile device comprising a processor, memory, and a camera flash associated with a camera application on the mobile device for capturing images, the memory comprising computer executable instructions for causing the processor to provide event notifications on the mobile device, the computer executable instructions comprising instructions for:
  upon detecting a particular event, determining that a notification is to be provided for the particular event;
  determining whether or not the camera application is currently being used;
  when the camera application is currently being used, activating at least one notification modality other than the camera flash to provide the notification; and
  when the camera application is not currently being used:
    determining a physical orientation of the mobile device indicative of a visibility of the camera flash;
    when the physical orientation indicates that the camera flash is visible, activating the camera flash to provide the notification for the particular event; and
    when the physical orientation indicates that the camera flash is not visible, activating the at least one notification modality other than the camera flash for the particular event.

* * * * *